(12) United States Patent
Goldberg

(10) Patent No.: US 9,115,462 B1
(45) Date of Patent: Aug. 25, 2015

(54) GRAVITY POWERED WASHING MACHINE

(71) Applicant: Sophie Rose Goldberg, Denver, CO (US)

(72) Inventor: Sophie Rose Goldberg, Denver, CO (US)

(*) Notice: Subject to any disclaimer, the term of this patent is extended or adjusted under 35 U.S.C. 154(b) by 0 days.

(21) Appl. No.: 14/568,271

(22) Filed: Dec. 12, 2014

Related U.S. Application Data

(63) Continuation of application No. 14/513,018, filed on Oct. 13, 2014.

(51) Int. Cl.
*D06F 37/30* (2006.01)
*D06F 21/02* (2006.01)
*D06F 37/32* (2006.01)
*F03G 3/00* (2006.01)

(52) U.S. Cl.
CPC ............... *D06F 37/30* (2013.01); *D06F 21/02* (2013.01); *D06F 37/32* (2013.01); *F03G 3/00* (2013.01)

(58) Field of Classification Search
CPC ......... D06F 21/02; D06F 21/04; D06F 37/30; D06F 37/32; F03G 3/00
USPC .............................................. 68/140; 185/27
See application file for complete search history.

(56) References Cited

U.S. PATENT DOCUMENTS

| | | | | |
|---|---|---|---|---|
| 554 A * | 1/1838 | Douglass | ................... | 185/32 |
| 2,104 A * | 5/1841 | Douglass | ................... | 185/32 |
| 25,949 A * | 11/1859 | Champlin | ................. | 68/144 |
| 26,078 A * | 11/1859 | Baker | ........................ | 185/32 |
| 99,376 A * | 2/1870 | Van Wyck | ................. | 185/27 |
| 192,027 A * | 6/1877 | Sternberger | ............... | 68/144 |
| 201,482 A * | 3/1878 | Barker | ........................ | 185/4 |
| 247,747 A * | 10/1881 | Coffin | ........................ | 185/29 |
| 360,688 A * | 4/1887 | Hassenpflug | .............. | 68/144 |
| 1,560,306 A * | 11/1925 | Patterson | ................. | 185/27 |
| 1,565,698 A * | 12/1925 | Wright | ..................... | 185/27 |
| 2,283,527 A * | 5/1942 | Apicella | ................... | 68/140 |
| 2012/0212948 A1* | 8/2012 | Riddiford | ................ | 362/184 |

* cited by examiner

*Primary Examiner* — Joseph L Perrin
(74) *Attorney, Agent, or Firm* — Holland & Hart LLP

(57) ABSTRACT

Methods, apparatuses and systems are described for utilizing the gravitational potential energy of a lifted weight to wash clothes. Systems may include a weight coupled with a cable such that the weight may be raised and lowered. Additionally, systems may include a rotation conversion system configured to convert the lowering of the weight into a rotational movement, and a torque transmission system configured to transmit the rotational movement from the rotation conversions system into a rotational movement of a washing drum. Moreover, methods for washing clothes may include capturing the kinetic energy of a weight being transformed from gravitational potential energy, converting the captured kinetic energy of the weight into a rotational movement of a crank shaft, and transmitting the rotational movement of the crank shaft into a rotational movement of a drive shaft coaxially supporting a washing drum.

10 Claims, 7 Drawing Sheets

GRAVITY POWERED WASHING MACHINE

CROSS REFERENCE

This application is a continuation of U.S. patent application Ser. No. 14/513,018, filed Oct. 13, 2014, entitled, "GRAVITY POWERED WASHING MACHINE," which is incorporated by reference in its entirety for all purposes.

BACKGROUND

There are many countries and regions around the world in which occupants have limited or no access to electricity or plumbing. In such regions, a person may have to manually scrub and wring out the clothes. This can be time-consuming, and such methods may place a physical burden on the person washing the clothes. In addition, the water source used to manually wash the clothes may become contaminated from the process. Accordingly, there may be a need for improved methods and systems to wash clothes in regions with limited or no access to electricity or plumbing.

SUMMARY

The described features generally relate to one or more gravity powered systems or methods for washing clothes. In general, a gravity powered system for washing clothes may include utilizing kinetic energy derived from gravitation potential energy to rotate a washing drum containing clothes, which may be housed within a drum housing configured to retain washing liquid.

According to various embodiments, a gravity powered system for washing clothes may include a cable attached to a weight that may be manually raised and lowered by gravity. The system may further include a rotation conversion system which is configured to convert the lowering of the weight into a rotational movement. The rotational movement may be transmitted by a torque transmission system into a rotation of a rotatable washing drum. The washing drum may include one or more fenestrations arranged on an outer surface of the drum. In some embodiments, the rotation conversion system may include a spool around which the cable may wind and unwind when the weight raises and lowers, respectively. Furthermore, the rotation conversion system may include a crank shaft that may rotate in a first direction when the cable winds around the spool and may rotate in a second direction when the cable unwinds from the spool. The rotation conversion system may further include a crank handle which may rotate the crank shaft in a first direction to raise the weight.

In some embodiments, the torque transmission system may include a crank sprocket, a drive chain, and a drive shaft. The crank sprocket may be configured to transmit, via the drive chain, rotational movement from the rotation conversion system to the drive shaft. In certain examples, the drive shaft may be coupled with the washing drum in some fashion. Furthermore, the torque transmission system may include a drive sprocket which is coupled with the drive shaft and the drive chain. The drive sprocket may be a unidirectional drive sprocket. In certain aspects, there may be multiple drive sprockets coupled with the drive shaft. In such an instance, each drive sprocket may have a different diameter.

According to various embodiments, the rotation conversion system may include a crank shaft and the torque transmission system may include a drive shaft. In such embodiments, the crank shaft and the drive shaft may be arranged in a parallel configuration. In another embodiment, the gravity powered washing system may include a drum housing that is configured to releasably retain the rotatable washing drum and washing liquid. Such a configuration may enable a user to wash clothes in a first drum housing containing washing liquid and then move the washing drum to a second drum housing with no washing liquid. Additionally, the drum housing may be configured to rotatably support a drive shaft which is coaxially coupled with the rotatable washing drum. In other embodiments, the gravity powered washing system may include multiple drum housings, each of which are configured to rotatably support a drive shaft. In certain aspects, the multiple drum housings may be configured to releasably couple with the drive shafts.

In another possible embodiment, the gravity powered washing system may include a drive shaft and multiple washing drums. The drive shaft may coaxially support the washing drums and be configured to rotate the washing drums simultaneously.

According to some embodiments, the gravity powered washing system may include a rotation conversion system which may have a spool coupled with a second end of a cable which is opposite a first end of the cable. The spool may be mounted to a crank shaft, and a crank sprocket may be mounted to the crank shaft in such a way that it enables it to rotate with the crank shaft. The gravity powered washing system may also include a torque transmission system which includes a crank handle coupled with the crank shaft and configured to rotate the crank shaft. In some examples, a rotation of the crank shaft with the crank handle in a first direction may cause the cable to wind around the spool such that the weight rises. Additionally, a lowering of the weight may unwind the cable from the spool causing a rotation of the crank shaft in a second direction which is opposite the first direction. Furthermore, a unidirectional drive sprocket may be mounted to a drive shaft and coupled with the crank sprocket by a drive chain. The drive sprocket may be configured to transmit rotation only in the second direction to the drive shaft. Furthermore, the washing drum of the gravity powered washing system may be coaxially mounted to the drive shaft and may include a closable loading door, as well as a plurality of fenestrations. In some embodiments, the washing drum may be housed within a drum housing which is configured to retain washing liquid and rotatably support the drive shaft in a parallel orientation to the crank shaft.

A gravity powered apparatus for washing clothes is described according to various embodiments. The apparatus may include means for raising a weight and means for lowering the weight. Additionally, the apparatus may include means for converting the lowering of the weight into a rotational movement of a crank shaft. Furthermore, the apparatus may include means for transmitting the rotational movement of the crank shaft into a rotational movement of a drive shaft that coaxially supports a washing drum.

A method for washing clothes is described according to various embodiments. The method may include capturing the kinetic energy of a weight being transformed from gravitational potential energy and converting it into a rotational movement of a crank shaft. Additionally, the method may include transmitting the rotational movement of the crank shaft into a rotational movement of a drive shaft that is coaxially supporting a washing drum. In some embodiments, the method may additionally include increasing the gravitational potential energy of the weight by raising the weight with a cable coupled with the crank shaft. Furthermore, the method may include raising the weight by rotating a crank handle that is coupled with the crank shaft in a first direction. The method may also include utilizing a unidirectional sprocket to transmit the rotational movement of the crank shaft to the drive shaft. The unidirectional sprocket may be coupled with the drive shaft and may be configured to convert only rotation in a second direction to the drive shaft.

In some embodiments, the method of washing clothes may include disengaging the washing drum from the drive shaft and removing the washing drum from a drum housing configured to house the washing drum. Additionally, the method may include engaging the washing drum with a second drive shaft of a second drum housing. Furthermore, the method may include adjusting a speed of a rotational movement of the washing drum. In one example, such an adjustment may be done by adjusting a ratio between the rotational movement of the crank shaft and a speed of the rotational movement of the drive shaft.

Certain embodiments of the present disclosure may include some, all, or none of the above advantages or features. One or more other technical advantages or features may be readily apparent to those skilled in the art from the figures, descriptions, and claims included herein. Moreover, while specific advantages or features have been enumerated above, various embodiments may include all, some, or none of the enumerated advantages or features.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices that utilize gravity to wash clothes are described. An exemplary system may include a rotatable washing drum that houses the clothes. The system may further include a source of gravitational potential energy, such as a weight, that is configured to be raised and lowered. The system may further include one or more sub systems configured to harness the kinetic energy of the weight as it is being lowered, convert that kinetic energy into a rotational movement, and transmit that rotational movement to the washing drum.

Figure 1:
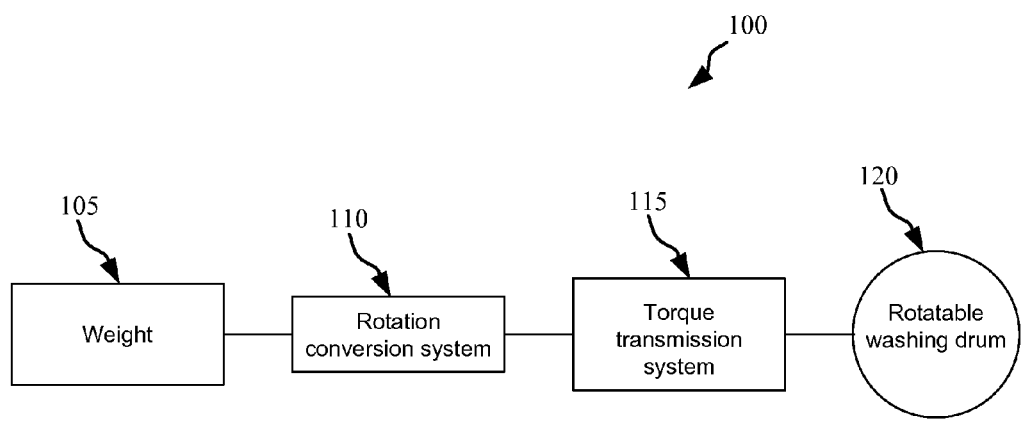
FIG. 1 is an illustration of a gravity powered washing system in accordance with various embodiments.

With reference to FIG. 1, a gravity powered washing system 100 is shown in accordance with various embodiments. System 100 may include a gravitational potential energy source, such as a weight 105. It may be appreciated that the gravitational potential energy of the weight 105 varies proportionally with both the height that the weight 105 is raised above the ground and with the mass of the weight 105. Moreover, it may be appreciated that the gravitational potential energy of the weight 105 is converted into kinetic energy as the weight 105 falls back towards the ground. In general, according to various embodiments, the conversion of gravitational potential energy into kinetic energy of the weight 105 is at least partially captured and converted into a rotational movement of a rotatable washing drum 120. The rotation of the washing drum 120 is utilized to wash clothes or any other items contained within the washing drum 120. Additionally, system 100 may include one or more subsystems that are configured to convert the lowering of the weight 105 into a rotational movement of the washing drum 120. For example, system 100 may include a rotation conversion system 110 configured to capture the lowering of weight 105 (and thus the kinetic energy of weight 105) and convert it into a rotational movement. Furthermore, system 100 may include a torque transmission system 115 configured to transmit a rotational movement from the rotation conversion system 110 into a rotational movement of the rotatable washing drum 120.

A rotation conversion system 110 may include one or more shafts, cranks, spools, sprockets, cables, chains, or any other elements suitable for converting the lowering of a weight 105 into a rotational movement. For example, a weight 105 may be attached to a cable that is routed through a pulley system configured to facilitate the vertical raising and lowering of the weight 105. The cable may also be wrapped or spooled around a shaft such that rotation of the shaft in a first direction causes the weight to rise above the ground, whereas lowering of the weight 105 causes the shaft to rotate in a second direction opposite the first direction.

A torque transmission system 115 may also include one or more shafts, cranks, spools, sprockets, cables, chains, or any other elements suitable for transmitting torque from one rotatable element to another. In general, a torque transmission system 115 transmits torque produced by a first rotatable element (such as a shaft) of the rotation conversion system 110 to a second rotatable element (such as a shaft) outside the rotation conversions system 110, thereby causing the second rotatable element to rotate. For example, a torque transmission system 115 may transmit the rotational movement produced by a rotation conversion system 110 into a rotational movement of a rotatable washing drum 120. In some embodiments, a torque transmission system 115 transmits torque in a one-to-one ratio. Alternatively, a torque transmission system 115 may include one or more gears of various sizes configured such that the torque transmitted from a rotation conversion system 110 to a rotatable washing drum 120 is adjustable.

Weight 105 may comprise any material or composition of materials including, but not limited to, sand, rock, wood, metal, or any other readily available material. The mass of the weight 105 may be adjustable by adding or removing elements such that a user may tailor the mass of weight 105 to the size of the washing load contained within the washing drum 120.

The washing drum 120 may be configured to wash the clothes or other items contained within by rotating or otherwise agitating the clothes with water and/or soap to dislodge the dirt or other contaminates from the clothes. Accordingly, a washing drum 120 may be configured to retain the water and soap until removed by the user through one or more drains. Alternatively, a washing drum 120 may comprise a plurality of fenestrations arranged on an outer surface of the drum 120 large enough to permit liquid, soap, and contaminates to pass through, but small enough that the clothes are retained within washing drum 120. In such an embodiment, the washing drum 120 may be at least partially submerged within water such that the rotation of the washing drum 120 forces water to pass in and out of the fenestrations, thereby washing and rinsing the clothes. The interior of the washing drum 120 may be smooth or may be textured to increase the efficacy of the washing drum 120. A washing drum 120 may be cylindrical or octagonal in shape and may be configured to rotate about the longitudinal axis of the cylinder.

Figure 2:
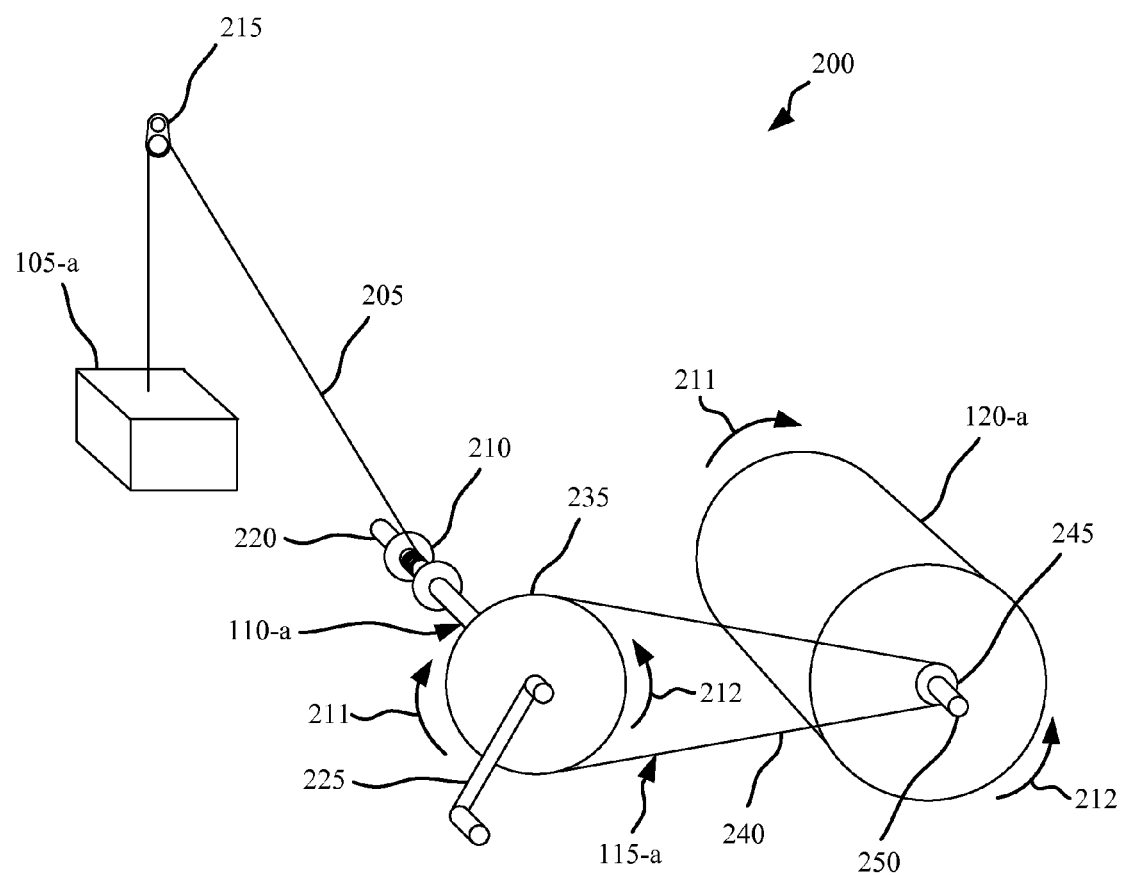
FIG. 2 is an illustration of a gravity powered washing system in accordance with various embodiments.

Turning to FIG. 2, a gravity powered washing system 200 is shown in accordance with various embodiments. System 200 may be an example of gravity powered washing system 100 described in connection with FIG. 1. Washing system 200 may include a weight 105-a, which may be an example of weight 105 illustrated in FIG. 1. According to various embodiments, weight 105-a may be controllably raised and lowered with a cable 205. The cable 205 may be attached at a first end to weight 105-a through any suitable connection means and may comprise any natural or synthetic material with a tensile strength sufficient to suspend the weight 105-a in the air. For example, the cable 205 may be made of one or more metallic materials, polymer materials, fibrous materials, or any such combination either in a braided configuration or as a single strand. System 200 may further include a pulley system 215 configured to facilitate the vertical raising and lowering of weight 105-a.

System 200 may further include a rotation conversion system 110-a, which may be an example of rotation conversion system 110 described in connection with FIG. 1. In general, a rotation conversion system 110-a is configured to convert the lowering of weight 105-a into a rotational movement of a crank shaft 220. The rotation conversion system 110-a may include a spool 210 around which cable 205 may be wound and unwound. The spool 210 may be coaxially supported by the crank shaft 220 and fixed to the crank shaft 220 such that the spool 210 rotates with the crank shaft 220. According to various embodiments, as the crank shaft 220 rotates in a first direction 211, the cable 205 winds around the spool 210, thereby raising the weight 105-a and increasing the gravitational potential energy of the weight 105-a. It may be appreciated that if weight 105-a is released or otherwise permitted to lower, the cable 105-a will unwind from the spool 210, which will cause the crank shaft 220 to rotate in a second direction 212 opposite first direction 211. In this way, the rotation conversion system 110-a converts a lowering of the weight 105-a into a rotational movement of the crank shaft 220.

In some embodiments, the rotation conversion system 110-a includes a crank handle 225 that is coupled with the crank shaft 220 and configured to facilitate rotation of the crank shaft 220. The crank handle 225 may be rotated by hand or may be coupled with a foot pedal or any other human or animal powered rotation means. Additionally, the crank handle 225 may be rotated by a motor or by a wind or water powered turbine.

System 200 may further include a torque transmission system 115-a, which may be an example of torque transmission system 115 described with reference to FIG. 1. According to various embodiments, the torque transmission system 115-a is configured to transmit a rotational movement from the rotation conversion system 110-a into a rotational movement of a washing drum 120-a, which may be an example of washing drum 120 described in connection with FIG. 1. In particular, the torque transmission system 115-a may be configured to transmit a rotation of the crank shaft 220 into a rotation of the drive shaft 250. As shown in FIG. 2, the drive shaft 250 may coaxially support the washing drum 120-a, and may be configured to rotate the washing drum 120-a. As shown in FIG. 2, the crank shaft 220 and the drive shaft 250 may be oriented parallel to each other. However, in alternate embodiments, shafts 220, 250 may be arranged orthogonally to each other or at another angle. For example, crank shaft 220 may be oriented horizontally as shown in FIG. 2, but drive shaft 250 (and thus washing drum 120-a) may be oriented in a vertical configuration. Regardless of the orientation of shafts 220, 250, a rotation of the crank shaft 220 may be transmitted to the drive shaft 250 via a drive chain 240. The drive chain 240 may comprise a chain, belt, cable, rope, or any other similar element capable of transmitting torque from one shaft to another.

According to various embodiments, the crank shaft 220 and the drive shaft 250 may be coupled with one or more sprockets, to which the drive chain 240 may be coupled. For example, a crank sprocket 235 may be coaxially mounted onto crank shaft 220. Similarly, a drive sprocket 245 may be coaxially mounted onto drive shaft 250. The sprockets 235, 245 may include teeth or other similar features around their outer circumference that are configured to interface with corresponding gaps or links in the drive chain 240 similar to a bike chain and sprocket configuration. Alternatively, where the drive chain 240 is a belt or other similar element without links, sprockets 235, 245 may include grooved or other textured features around their outer circumference to increase the friction and reduce slippage between sprockets 235, 245 and drive chain 240.

It may be appreciated that the diameter of sprockets 235, 245 may be adjusted relative to each other to vary the gear ratio between crank sprocket 235 and drive sprocket 245. In some embodiments, sprockets 235, 245 may have the same diameter, which would result in a one-to-one gear ratio. Alternatively, the diameters of sprockets 235, 245 may be configured such that a single rotation of the crank sprocket 235 will cause multiple rotations of the drive sprocket 245. By manipulating the gear ratios between the two sprockets 235, 245, the speed of rotation of the drive shaft 250 (and therefore washing drum 120-a) may be controlled relative to the speed of rotation of the crank shaft 220. Moreover, in some embodiments, multiple sprockets may be mounted to the same shaft. For example, multiple drive sprockets 245 of various diameters may be mounted to the drive shaft 250. In such an embodiment, the gear ratio between sprockets 235, 245 may be adjusted by moving the drive chain 240 from one size drive sprocket 245 to another. Moving drive chain 240 between sprockets of varying sizes may be accomplished manually or by a derailleur device (not shown) similar to a bicycle configuration.

In some embodiments, either one or both of sprockets 235, 245 may comprise a unidirectional sprocket. As used herein, a unidirectional sprocket may transfer rotation of the sprocket in one direction to the shaft to which it is mounted, but will not transfer rotation in the opposite direction to the shaft. For example, drive sprocket 245 may be a unidirectional sprocket according to various embodiments. As such, drive sprocket 245 may be configured such that only a rotation of sprocket 245 in a second direction 212 causes a rotation of the drive shaft 250. Accordingly, as the drive sprocket 245 is rotated in a first direction 211, sprocket 245 will not transfer the rotation to the drive shaft 250. Such an arrangement allows the weight 105-a to be raised (by rotating crank sprocket 235 in first direction 211), without causing drive sprocket 245 (and thus washing drum 120-a) to rotate, thereby reducing the effort required to raise the weight 105-a.

Figure 3:
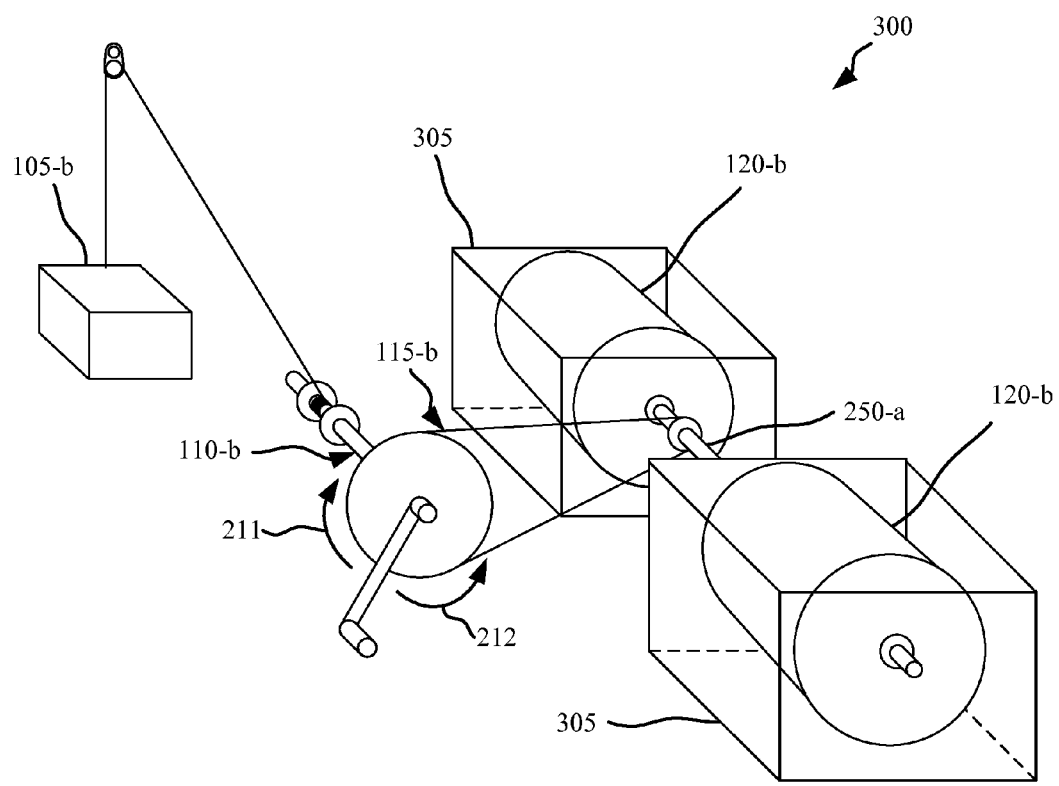
FIG. 3 is an illustration of a gravity powered washing system with a plurality of drum housings in accordance with various embodiments.

It may be desirable to wash multiple loads of clothes simultaneously using only a single weight 105. Such a device may decrease the time and effort required to wash multiple loads of clothes with a gravity powered washing device. Therefore, according to various embodiments, the kinetic energy captured from the lowering of a weight 105 may be utilized to rotate more than one rotatable washing drum 120 simultaneously. For example, FIG. 3 illustrates a gravity powered washing system 300 with multiple washing drums 120-b in accordance with various embodiments. Washing system 300 may be an example of washing systems 100, 200 described above with reference to FIGS. 1 and 2, respectively. Additionally, washing system 300 may include one or more drum housings 305 in which washing drums 120-b may be contained. In general, the drum housings 305 are configured to partially or fully encompass washing drum 120-b, and may be open at the top or contain a lid. Moreover, the drum housings 305 may be configured to retain liquid by either comprising water tight materials or by including a water resistant inner liner. Accordingly, a washing drum 120-b may be at least partially submerged in water or some other washing liquid when contained within the drum housings 305. The drum housings 305 may also comprise one or more drains for the removal of liquid, soap, and contaminates contained within drum housing 305. As shown in FIG. 3, each drum housing 305 may contain a single washing drum 120-b. Alternatively, a drum housing 305 may be configured to contain multiple washing drums 120-b.

The drum housings 305 may be further configured to rotatably support one or more drive shafts 250-a. For example, two opposite-facing side walls of drum housing 305 may include holes such that drive shaft 250-a may pass through and be supported by the walls. The holes in a drum housing 305 may be fitted with one or more bearings or bushings configured to interface with a drive shaft 250-a to reduce friction and increase the rotation performance of the drive shaft 250-a.

Similar to gravity powered washing systems 100, 200 described in FIGS. 1-2, washing system 300 may include a weight 105-b, a rotation conversion system 110-b, and a torque transmission system 115-b. As described in FIG. 2, the weight 105-b may be raised by rotating one or more components of a rotation conversion system 110-b in a first direction 211. Once the weight 105-b is raised to a sufficient height, it may be permitted to fall back towards the ground, thereby casing a rotation in a second direction 212, which is transmitted from the rotation conversion system 110-b to the drive shaft 250-a by a torque transmission system 115-b. Accordingly, shaft 250-a is rotated in a direction 212, thereby causing the plurality of washing drums 120-b to rotate in the direction 212.

In certain instances, it may be desirable to remove a washing drum 120 from one drum housing 305 and to place it in a different drum housing 305. Such an arrangement would allow a user to perform a first wash cycle in a first drum housing 305 and then move the washing drum 120 to a second drum housing 305 to perform a second wash cycle. For example, the first drum housing 305 may retain water and soap in order to wash a load of clothes and the second drum housing 305 may retain only water in order to rinse the load of clothes. In another embodiment, the first drum housing 305 may be configured to perform a wash cycle that is of a different duration or intensity than that of the second drum housing 305. In some examples, the first drum housing 305 may retain water or washing liquid to wash a load of clothes and the second drum housing 305 may retain no water or washing liquid so that a load of clothes may be dried.

Figure 4:
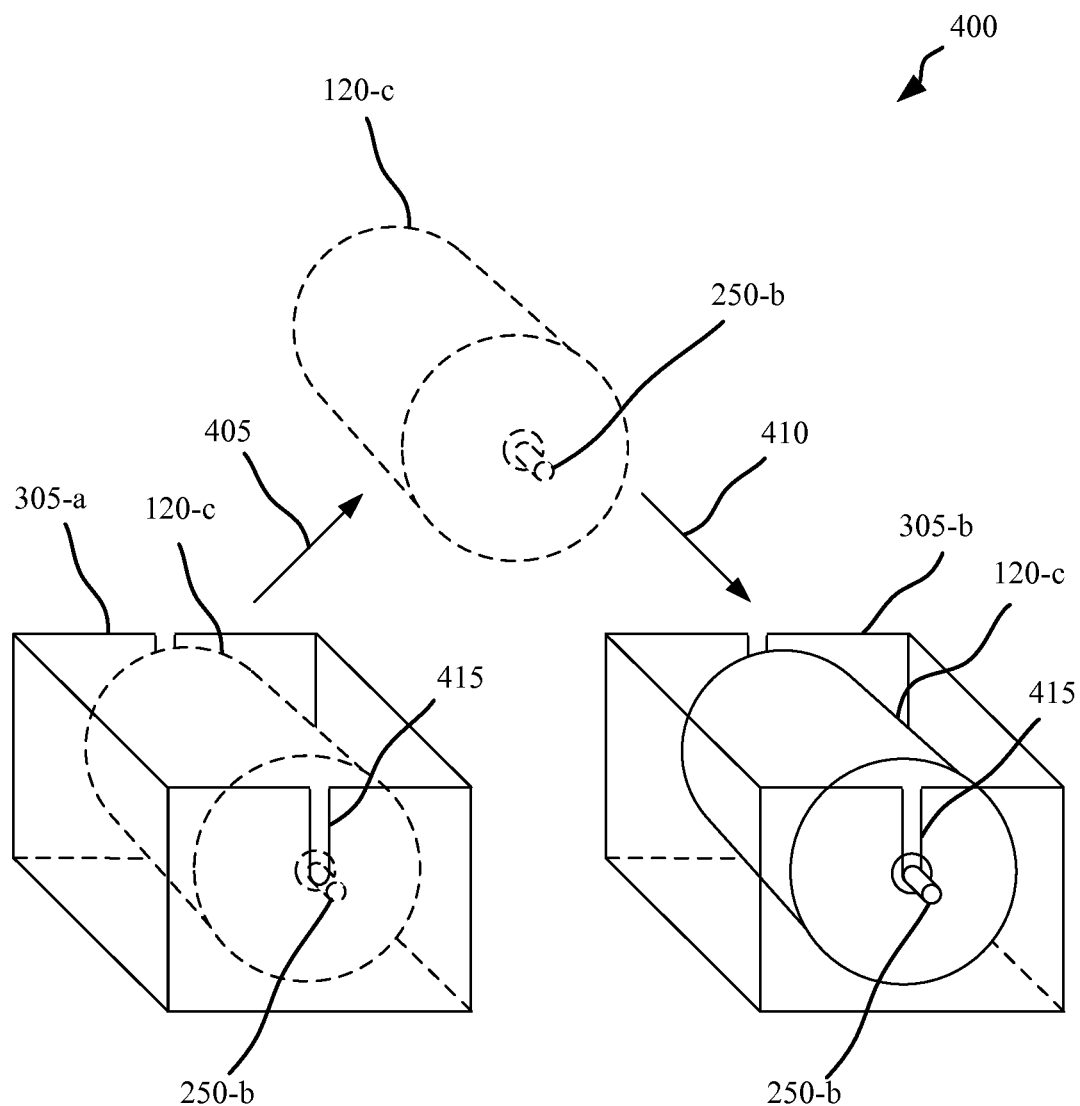
FIG. 4 is an illustration of a gravity powered washing system with removable washing drums in accordance with various embodiments.

Therefore, according to various embodiments of the present invention, the drum housing 305 is configured to facilitate the easy engagement and disengagement of a washing drum 120. For example, FIG. 4 illustrates a washing system 400 with two drum housings 305-a, 305-b configured to removably retain a washing drum 120-c. As shown in FIG. 4, drive shaft 205-b may be disengaged and removed (arrow 405) from a first drum housing 305-a, and then engaged with a second drum housing 305-b (arrow 410). Drum housings 305-a, 305-b may include slits 415 configured to facilitate the insertion and removal of drive shaft 250-b. Drum housings 305-a, 305-b may further include latches or other similar coupling and decoupling members to facilitate the engagement and disengagement of drive shaft 250-b to and from drum housings 305-a, 305-b. Alternatively, instead of removing drive shaft 250-b along with washing drum 120-c, washing drum 120-c may be configured to disengage from a first drive shaft 250-b coupled with the first drum housing 305-a and then engage with a second drive shaft 250-b coupled with the second drum housing 305-b.

Figure 5:
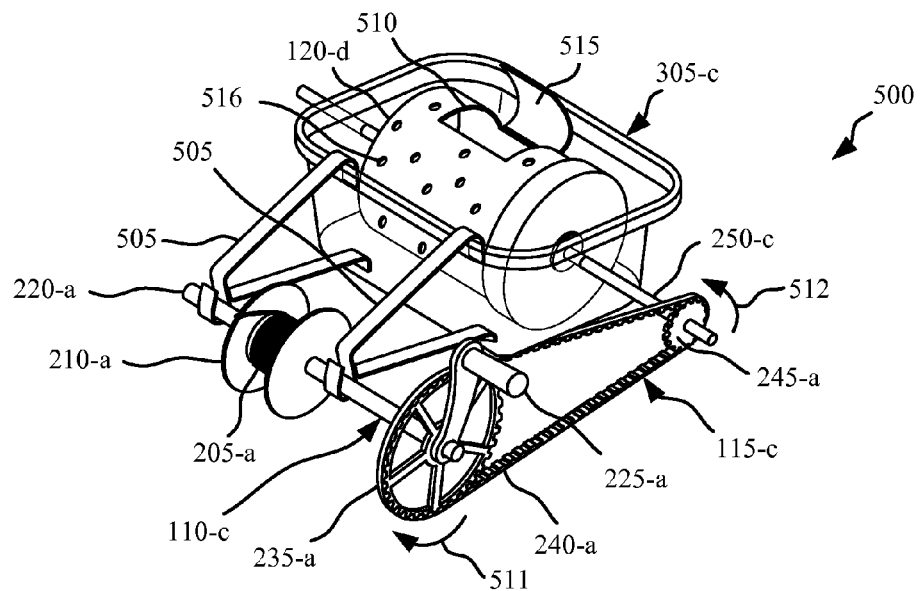
FIG. 5 is a perspective view illustration of a gravity powered washing system in accordance with various embodiments.

Turning to FIG. 5, a perspective view of a gravity powered washing system 500 is shown, which may be an example of any washing system 100, 200, 300, or 400, as described with reference to FIGS. 1-4. Washing system 500 may comprise a rotation conversion system 110-c, which may be an example of any rotation conversion system 110 described with reference to FIGS. 1-3. The rotation conversion system 110-c may include a spool 210-a that is coaxially mounted to a crank shaft 220-a such that the spool 210-a rotates with the crank shaft 220-a. Moreover, the spool 210-a may be coupled with a cable 205-a such that the cable 205-a winds around the spool 210-a when the crank shaft 220-a is rotated in a first direction 511. Additionally, to facilitate rotation of the crank shaft 220-a, the rotation conversion system 110-c may further include a crank handle 225-a coupled with the crank shaft 220-a. Accordingly, rotating the crank handle 225-a in a first direction 511 may cause both the crank shaft 220-a and the spool 210-a to rotate in the first direction 511 such that the cable 205-a will wind around spool 210-a, thereby lifting a weight 105 (not shown). As described in FIG. 2, if a weight 105 (not shown) is allowed to lower, the cable 205-a will unwind from the spool 210-a, which will rotate the crank shaft 220-a in a second direction 512 opposite first direction 511.

Washing system 500 may further include a torque transmission system 115-c, which may be an example of any torque transmission system 115 described in connection with FIGS. 1-3. The torque transmission system 115-c may comprise a crank sprocket 235-*a*, a drive chain 240-*a*, and a drive sprocket 245-*a*, each of which may be examples of crank sprocket 235, drive chain 240, and drive sprocket 245, respectively, described in connection with FIG. 2. In general, a torque transmission system 115-*c* is configured to transmit rotational movement of a crank shaft 220-*a* to a drive shaft 250-*c*. For example, rotational movement of crank shaft 220-*a* and crank sprocket 235-*a* may be transmitted via a drive chain 240-*a* to drive sprocket 245-*a*, which in turn is transmitted to drive shaft 250-*c*. As described in connection with FIG. 2, the drive sprocket 245-*a* may be unidirectional, such that only a rotation of drive sprocket 245-*a* in a direction 512 is transmitted to drive shaft 250-*c*. As such, when the crank shaft 220-*a* and the crank sprocket 235-*a* are rotated in direction 511, drive sprocket 245-*a* freely spins around drive shaft 250-*c*. However, it may be appreciated that the drive sprocket 245-*a* may be reversed such that only rotation in a first direction 511 will be transmitted to the drive shaft 250-*c*.

Washing drum 120-*d*, which may be an example of any washing drum 120 described with reference to FIGS. 1-4, may include an access portal 510 on the outer circumferential surface of washing drum 120-*d* for introducing and removing elements to and from washing drum 120-*d*. The portal 510 may be sealed by closing drum door 515. The door 515 may be attached to washing drum 120-*d* by a hinge or through any other suitable connection means. In some embodiments, washing drum 120-*d* may comprise a plurality of fenestrations 516 arranged on an outer surface of the drum 120-*d*. Moreover, washing system 500 may include a drum housing 305-*c*, which may be an example of any drum housing 305 described in connection with FIGS. 3-4.

As shown in FIG. 5, the rotation conversion system 110-*c* may be supported with one or more mounting brackets 505. Although FIG. 5 shows two mounting brackets 505, any number of mounting brackets 505 may be used. Moreover, mounting brackets 505 may be coupled directly to drum housing 305-*c* (as shown in FIG. 5), or they may be mounted directly to the ground or a support platform (not shown).

Figure 6:
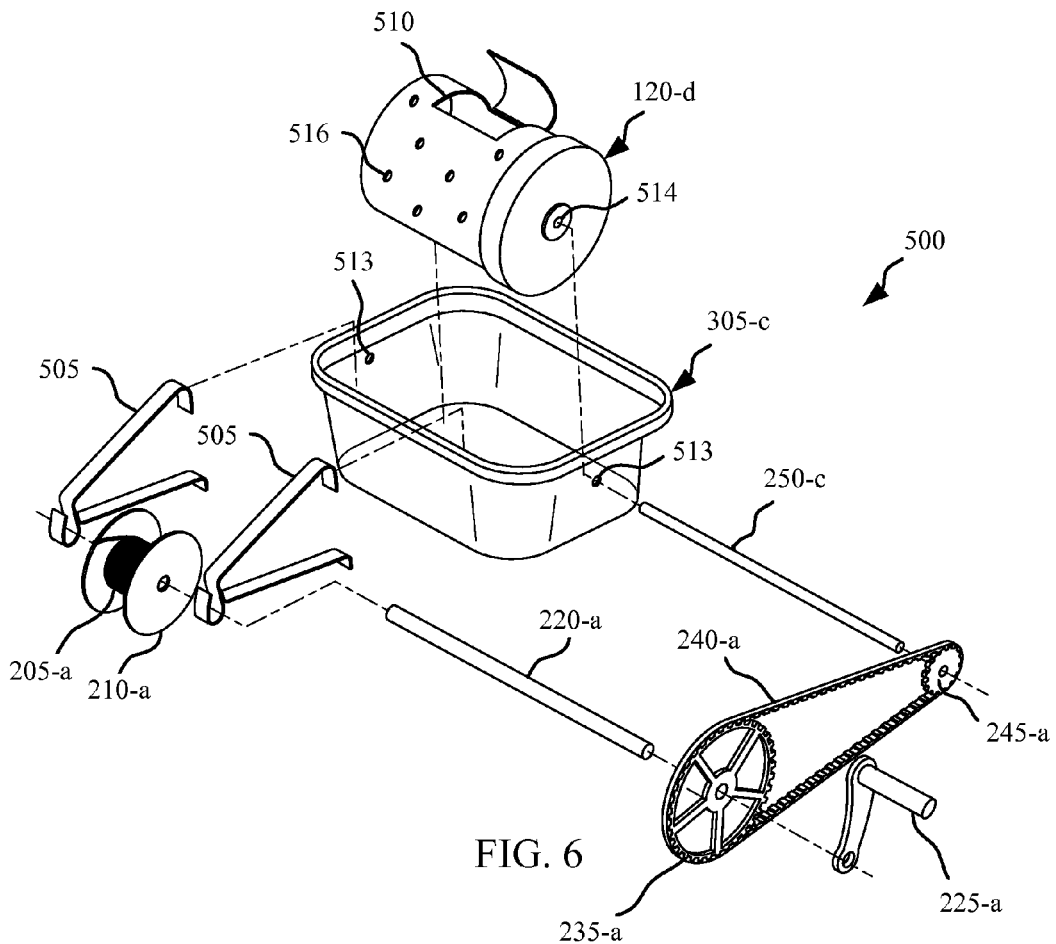
FIG. 6 is a perspective exploded view illustration of a gravity powered washing system in accordance with various embodiments.

FIG. 6 shows an exploded perspective view of washing system 500. As shown in FIG. 6, the drum housing 305-*c* may include holes 513 arranged on two opposite-facing side walls of drum housing 305-*c* configured to accept and rotatably support the drive shaft 250-*c*. In some embodiments, one or more bushings, bearings, or other similar rotational components may be coupled with holes 513, thereby reducing the friction between shaft 250-*c* and drum housing 305-*c*. Additionally, the washing drum 120-*d* may include holes 514 arranged on the two opposite-facing flat surfaces of cylindrical washing drum 120-*d* such that drive shaft 250-*c* may pass through the center of washing drum 120-*d*. The washing drum 120-*d* may be mounted to drive shaft 250-*c* such that washing drum 120-*d* rotates with drive shaft 250-*c*.

Figure 7:
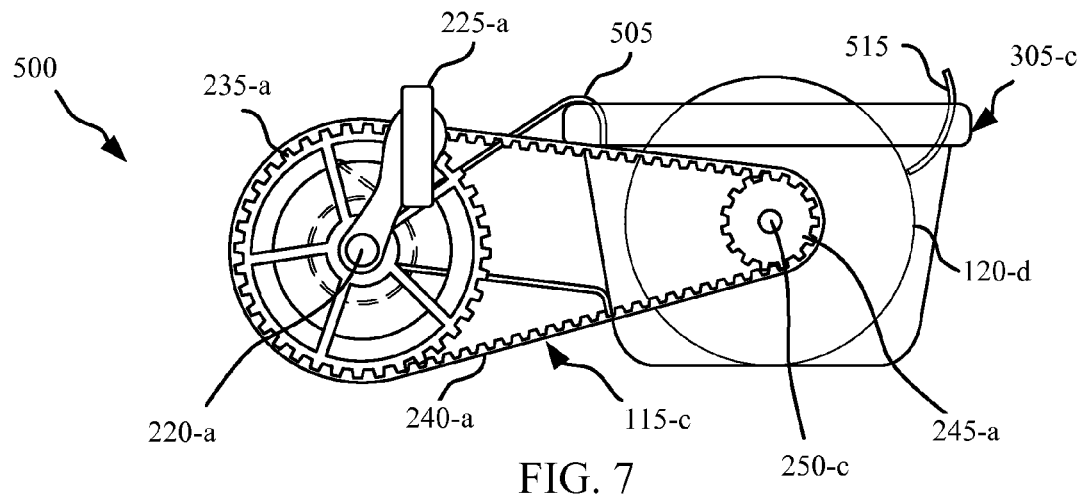
FIG. 7 is a side view illustration of a gravity powered washing system in accordance with various embodiments.

FIG. 7 illustrates a side view of washing system 500. As shown in FIG. 7, the torque transmission system 115-*c* may comprise a crank sprocket 235-*a* that has a larger diameter than drive sprocket 245-*a*. In such a configuration, a single rotation of the crank sprocket 235-*a* will cause multiple rotations of the drive sprocket 245-*a*, which will cause multiple rotations of the washing drum 120-*d*. Although the torque transmission system 115-*c* is shown comprising a single crank sprocket 235-*a* and a single drive sprocket 245-*a*, in some embodiments, the torque transmission system 115-*c* may comprise a plurality of crank sprockets 235-*a* and/or a plurality of drive sprockets 245-*a*. It may be further appreciated that the plurality of crank sprockets 235-*a* and drive sprockets 245-*a* may comprise a variety of different diameters. As described with reference to FIG. 2, the torque and speed ratio between crank shaft 220-*a* and drive shaft 250-*c* may be modified and controlled by adjusting the relative diameters of crank sprocket 235-*a* and drive sprocket 245-*a*. Additionally, the plurality of sprockets 235-*a*, 245-*a* may be configured to allow a user to change the rotational direction of drive shaft 250-*c* with respect to crank shaft 220-*a*. Although washing drum 120-*d* is shown with its longitudinal axis being horizontally orientated (and parallel with crank shaft 220-*a*), it may be appreciated that the longitudinal axis of washing drum 120-*d* may be at any angle, including vertically oriented.

Figure 8:
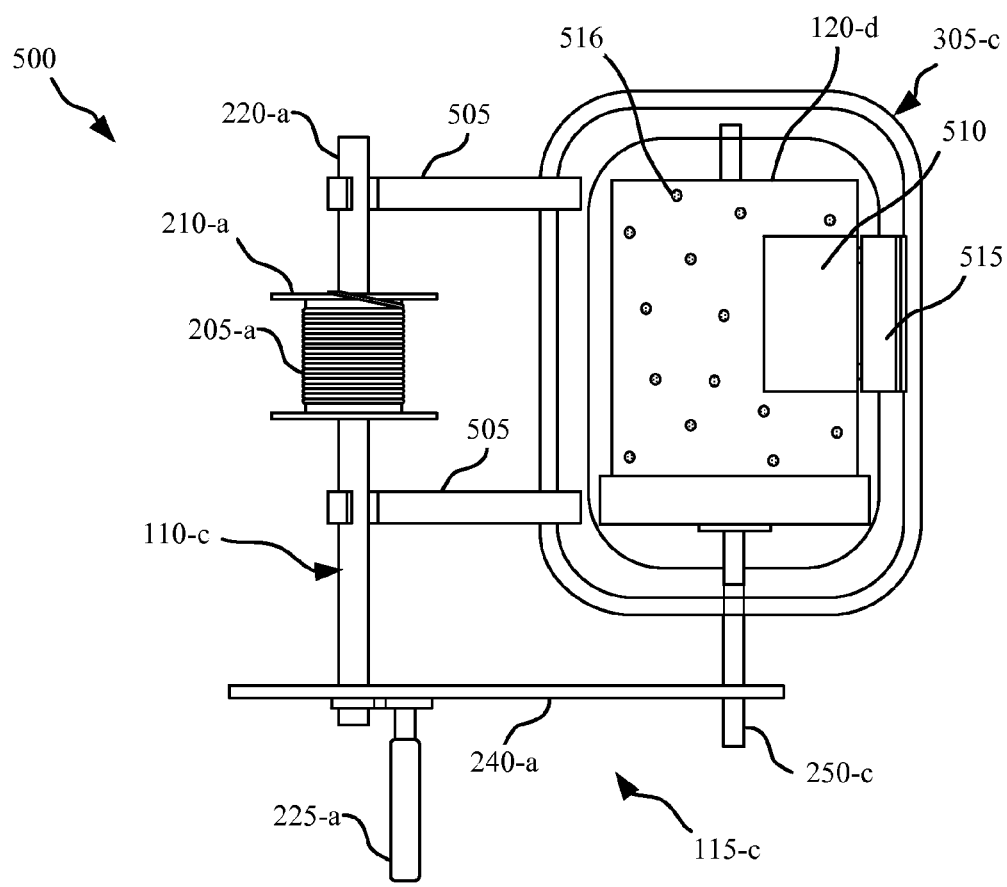
FIG. 8 is a top view illustration of a gravity powered washing system in accordance with various embodiments.

A top view of washing system 500 is shown in FIG. 8. As shown, the crank shaft 220-*a* is mounted substantially parallel to the drive shaft 250-*c*. Alternatively, crank shaft 220-*a* and drive shaft 250-*c* may be arranged to form some angle with respect to one another. The drive shaft 250-*c* may couple with a washing drum 120-*d* such that drive shaft 250-*c* extends all the way through washing drum 120-*d*. However, in some embodiments, the drive shaft 250-*c* may only extend partially through the washing drum 120-*d* from one side, or may extend only partially from each side. In yet other embodiments, drive shaft 250-*c* may be configured to couple with the outside of washing drum 120-*d* and not extend to the interior of washing drum 120-*d* at all.

Figure 9:
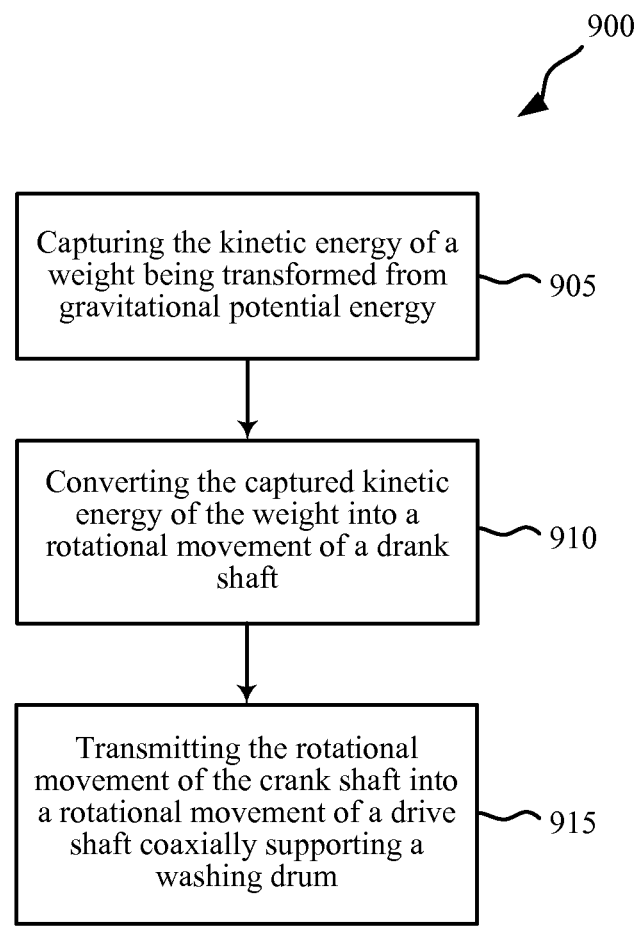
FIG. 9 is a flow chart of a method for washing clothes in accordance with various embodiments.

Turning to FIG. 9, a flowchart is depicted illustrating a method 900 for washing clothes in accordance with various embodiments. The operations of method 900 may be implemented with any of the washing systems, sub-systems, or components described with reference to FIGS. 1-8. The method 900 may include, at block 905, capturing kinetic energy of a weight 105 being transformed from gravitation potential energy. Weight 105 may be an example of any of weights 105 described in connection with FIGS. 1-3. The transformation of gravitational potential energy into kinetic energy may be the result of weight 105 falling towards the ground. Additionally, capturing the kinetic energy may be accomplished through use of a cable 205, as described in FIG. 2.

Method 900 may further include, at block 910, converting the captured kinetic energy of the weight 105 into a rotational movement of a crank shaft 220. Converting the kinetic energy of a weight 105 into a rotation movement of a crank shaft 220 may be implemented with a rotation conversion system 110 as described in connection with any of FIGS. 1-3 and 5-8.

Furthermore, method 900 may include, at block 915, transmitting the rotational movement of the crank shaft 220 into a rotational movement of a drive shaft 250 coaxially supporting a washing drum 120. Transmitting the rotational movement of a crank shaft 220 into a rotational movement of a drive shaft 250 may be implemented with a torque transmission system 115 described in connection with any of FIGS. 1-3 and 5-8.

In some embodiments, a method for washing clothes may further comprise increasing the gravitational potential energy of a weight 105 by raising the weight 105 with a cable 205 coupled with a crank shaft 220. As described in connection with FIG. 2, the cable 205 may be coupled with a pulley system 215 to facilitate the raising of a weight 105. Moreover, raising the weight 105 may comprise rotating a crank handle 225 coupled with the crank shaft 220 in a first direction 211.

Additionally, transmitting the rotational movement of the crank shaft 220 to the drive shaft 250 may comprise utilizing a unidirectional drive sprocket 245 coupled with the drive shaft 250 configured to convert only rotation in a second direction 212 to the drive shaft 250, wherein rotation in the second direction 212 is opposite rotation in the first direction 211. In some embodiments, as described with reference to FIG. 4, a method of washing clothes may also include disengaging a washing drum 120-c from the drive shaft 250-b, removing the washing drum 120-c from a drum housing 305-a, and engaging the washing drum 120-c with a second drive shaft 250-b of a second drum housing 305-b.

According to various embodiments, a method of washing clothes may further include adjusting the speed of a rotational movement of a washing drum 120 by adjusting a ratio between a speed of rotational movement of a crank shaft 220 and a speed of rotational movement of a drive shaft 250. As described with reference to FIGS. 2 and 7, the relative rotations between crank shaft 220 and drive shaft 250 can be adjusted by manipulating the ratio between the sizes of crank sprocket 235 and drive sprocket 245.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

The invention claimed is:

1. A gravity powered system for washing clothes comprising:
   a weight coupled with a first end of a cable and configured to be raised and lowered;
   a rotation conversion system configured to convert the lowering of the weight into a rotational movement comprising:
      a spool coupled with a second end of the cable opposite the first end and mounted to a crank shaft; and
      a crank sprocket mounted to the crank shaft configured to rotate with the crank shaft;
   a rotatable washing drum; and
   a torque transmission system configured to transmit the rotational movement from the rotation conversion system into a rotational movement of the washing drum comprising:
      a crank handle coupled with the crank shaft and configured to rotate the crank shaft, wherein rotation of the crank shaft with the crank handle in a first direction causes the cable to wind around the spool such that the weight raises, and wherein a lowering of the weight unwinds the cable from the spool causing rotation of the crank shaft in a second direction opposite the first direction; and
      a unidirectional drive sprocket mounted to a drive shaft and coupled with the crank sprocket by a drive chain, the drive sprocket configured to transmit only rotation in the second direction to the drive shaft such that as the drive sprocket is rotated in the first direction, the washing drum remains stationary.

2. The system of claim 1, further comprising a plurality of drive sprockets coupled with the drive shaft, each drive sprocket having a different diameter.

3. The system of claim 1, wherein
   the drive shaft and the crank shaft are arranged in a parallel configuration.

4. The system of claim 1, further comprising a drum housing configured to:
   releasably retain the washing drum;
   releasably retain a washing liquid; and
   rotatably support the drive shaft coaxially coupled with the washing drum.

5. The system of claim 1, further comprising:
   a plurality of drum housings, each drum housing configured to rotatably support a corresponding drive shaft, wherein the washing drum is configured to releasably couple with the plurality of drive shafts of the plurality of drum housings.

6. The system of claim 1, further comprising:
   one or more additional washing drums; and
   the drive shaft coaxially supporting the washing drum and the one or more additional washing drums and configured to rotate the washing drum and the one or more additional washing drums simultaneously.

7. The system of claim 1, wherein the washing drum comprises a plurality of fenestrations.

8. The system of claim 1, wherein:
   the rotatable washing drum is coaxially mounted to the drive shaft and comprises a closable loading door and a plurality of fenestrations; wherein the washing drum is housed within a drum housing configured to retain a washing liquid and rotatably support the drive shaft in a parallel orientation to the crank shaft.

9. The system of claim 1, wherein
   the rotatable washing drum is coaxially mounted to the drive shaft and comprises a closable loading door and a plurality of fenestrations, wherein the drive shaft is oriented parallel to the crank shaft.

10. A gravity powered apparatus for washing clothes comprising:
    means for raising a weight comprising a crank handle coupled with a crank shaft and configured to rotate the crank shaft, wherein rotation of the crank shaft with the crank handle in a first direction causes a cable coupled with the weight to wind around a spool mounted to the crank shaft;
    means for lowering the weight;
    means for converting the lowering of the weight into a rotational movement of the crank shaft comprising a crank sprocket mounted to the crank shaft configured to rotate with the crank shaft; and
    means for transmitting the rotational movement of the crank shaft into a rotational movement of a drive shaft comprising a unidirectional drive sprocket mounted to the drive shaft and coupled with the crank sprocket by a drive chain, the drive sprocket configured to transmit only rotation in a second direction opposite the first direction to the drive shaft such that as the drive sprocket is rotated in the first direction, the washing drum remains stationary.

* * * * *